June 17, 1969 E. W. DONATH 3,450,343
TEMPERATURE RESPONSIVE CONTROLLER SYSTEM
Filed Dec. 21, 1967
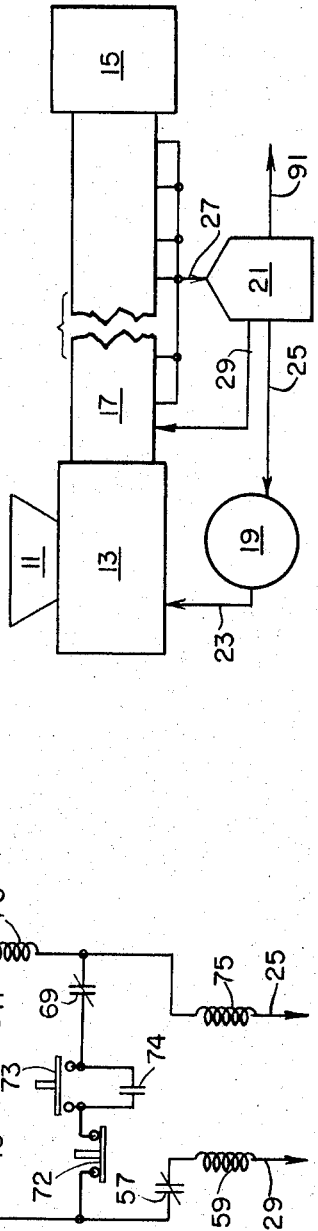
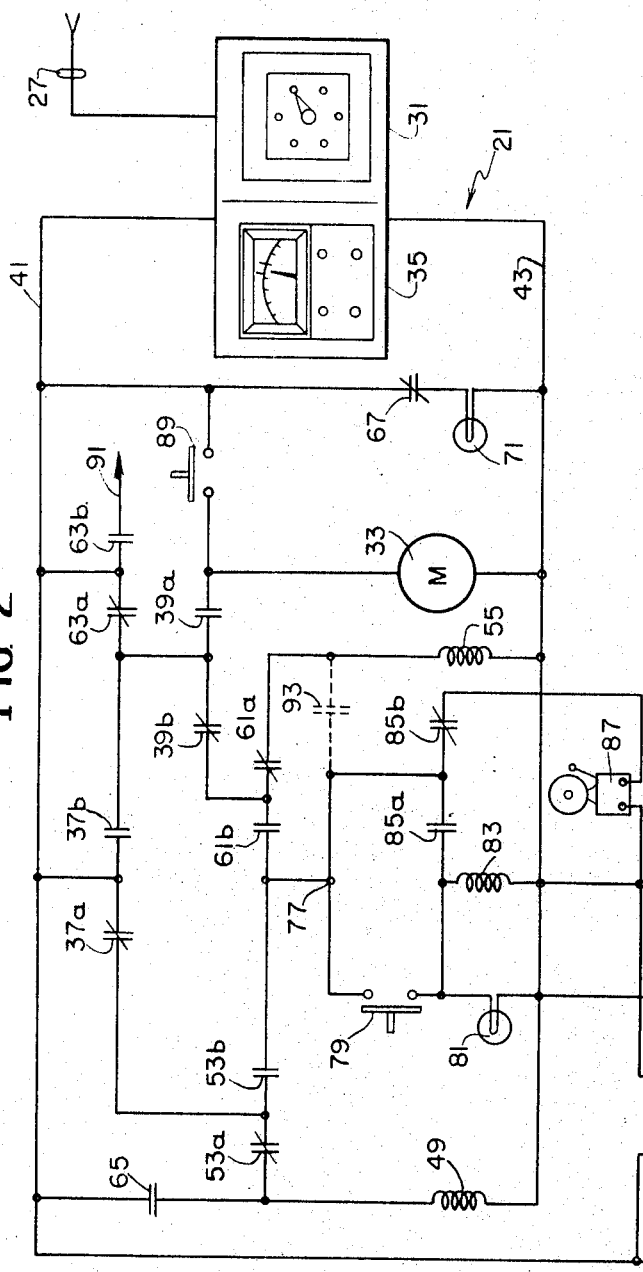
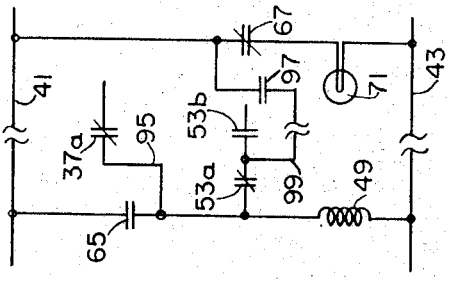
Inventor
EDWIN W DONATH
BY Silverman & Cass
Attys.

3,450,343
TEMPERATURE RESPONSIVE CONTROLLER SYSTEM

Edwin W. Donath, Arlington Heights, Ill., assignor to Alnor Instrument Company, Div. of Illinois Testing Laboratories, Inc., Chicago, Ill., a corporation of Illinois
Filed Dec. 21, 1967, Ser. No. 692,582
Int. Cl. B21c 31/00
U.S. Cl. 236—46   22 Claims

ABSTRACT OF THE DISCLOSURE

A semi-automatic system for scanning and sensing the temperature of a plurality of points within equipment, such as a plastic molding machine, and for controlling the sequential operations of the equipment in response to the sensed temperature. A controller portion of the system comprises a plurality of electrical relays, most of which operate automatically in response to temperature and/or time conditions, to establish a plurality of discrete and interacting control circuit paths for sequencing the controlled equipment and also for operating condition information elements within the controller. Upon the transmission of condition information to the human operator, one or more manual switches are employed to further affect the control circuit paths to optimize the safe operation of the controlled equipment.

FIELD OF THE INVENTION

This invention concerns the control of several sequential operations of processing equipment and, more particularly, the combined temperature monitoring and temperature dictated operational controlling of processing equipment, such as injection and extrusion molding machines.

DESCRIPTION OF THE PRIOR ART

The history of temperature monitoring devices parallels the history of the use of fire and for the most part the harnessing of heat energy to the will of man and his technology. From the crudest types of thermometers to the most sophisticated forms of pyrometers, and from basic thermostats to complex temperature controllers, the fundamentals are the same—a desire to obtain an accurate temperature reading so that a particular activity can be regulated. The thermostat in a home monitors ambient temperature for the purpose of maintaining a constant or periodically called for level of comfort. In a forced air furnace, the operation of the ambient thermostat usually enables the operation of two other independent temperature responsive controllers—a fuel supply regulator and an air blower. Thus, there is both temperature scanning and equipment regulation having as the object temperature control.

Numerous industrial applications also are directed to temperature scanning and temperature control paralleling, yet often far more complex than a home furnace. The particular industrial applications of a preferred embodiment of the present invention is plastic molding. Heretofore, plastic molding has employed many forms of temperature monitoring. In the formative years of this industry, the human operators were highly skilled and, by use of little other than their five senses, were able to ascertain and regulate not only suitable operating temperatures, but also pressure, feeding rate, and other parameters. However, in recent times, the need for great quantities of molded products, formed from an ever increasing number of plastics and plastic combinations, has made it impossible for even skilled operators to maintain production parameters without monitoring instrumentation.

The parameter ranges have become increasingly more critical as the raw materials have become more specialized; the finished products have varied uses which subject them to high stresses, abnormal temperatures, etc.; and the rate of productivity has been forced to become maximized for each molding machine. For example, injection molding of some plastics requires no more than ten thousand p.s.i. of pressure developed by the ram; whereas, other plastics and/or uses require the development of upwards to twenty-five thousand p.s.i. Similarly, temperatures from 300° F. to 600° F. are needed, some with as much as one hundred degrees tolerance, others with as little as ten degrees of tolerance.

Typically, if the melt is too cold as it leaves the nozzle of the heating cylinder, the mold won't fill out and the product will show weld and flow marks and have a dull appearance. If the melt is too hot, striation, scales, burns, sink marks and decoloration of the product results. Excessive temperatures also initiate degradation and decomposition of the plastic. Not only does this lead to faulty products, but it generates byproducts in the form of fumes and fluids which are dangerous to the human operators as well as corrosive to the machinery.

Polyvinyl chloride is a prime example of a plastic which is of increasing importance. If extrusion is accomplished at a relatively slow rate, a melt temperature of 350° to 380° is appropriate. However, increased production needs require higher production rates, which force operation up to a range of 400° to 440°. When operating at such elevated temperatures, degradation and the formation of hydrochloric acid and fumes can result if temperature and/or pressure parameters are not rigidly maintained.

Pressure plays an important part in heat generation. In fact, in certain extrusion operations, termed adiabatic extrusion, the mechanical heat generated by the screw driving the charges of plastic material through the barrel of the extruder is more than enough to melt the plastic. Hence, a deviation from pressure in any molding process could cause undesired heat fluctuations even if the heat applying and/or cooling equipment were operating correctly.

Even if temperatures were maintained well within the safe molding limits of the plastic, undesirable products could be obtained. For example, cellulosics lose tensile strength and gain impact strength as melt temperatures increase from a relatively low level. Thus, too warm a melt cannot produce a high tensile strength product.

Not only are well regulated temperature ranges necessary throughout the heating cylinder, but specific ranges at various portions of the cylinder are common. Usually, the temperature within the cylinder increases in the direction of the nozzle, which communicates with the sprue of the mold. Some operations necessitate a uniform rate of increase, others do not. Polyethylene has characteristics which make it advantageous for the nozzle temperature to be significantly higher than the rearward adjacent portion of the cylinder.

The foregoing points up the need for temperature monitoring of plastic molding equipment, but this is only half of the story—the other half relates to control of the equipment with response to temperature conditions. There are special problems which inhibit or at least modify common solutions to the control of plastic molding equipment. The most far reaching is that the equipment should not be turned off when containing a melt, even a defective melt, for then the melt would setup in the heater cylinder and force a prolonged shutdown for dismantling, cleaning and possibly even remachining of components. This leads to the next problem, which is that the continued malfunctioning operation of the equipment must be minimized, primarily for protection of the equipment and operators and only secondarily because of loss of product and productivity. Improperly molded articles can be ground up and fed back into the equipment as raw product.

Because of the above and other problems and conditions, automatic or even semi-automatic control of molding equipment in response to temperature has not been attempted to the extent that those otherwise skilled in the equipment control arts would expect. For the most part, temperature monitoring and scanning of the molding equipment have not been supplemented by control of the equipment in response to temperature conditions. In the prior art, one or more thermocouples have been positioned within the heating cylinder and coupled to indicating instruments. On-off thermostats have been employed and proportioning thermostats have been suggested. Although such instrumentations have been of value in monitoring and regulating the cylinder temperature, there has not been marketed apparatus which responds to cylinder temperatures, both normal and abnormal, for the semi-automatic control of the various phases of operation of the equipment, both under normal and abnormal temperature conditions.

BRIEF SUMMARY OF THE INVENTION

The present invention periodically scans the temperature at a plurality of points in a piece of equipment, such as the heating cylinder of a plastic molder. Each distinct temperature level is transduced to an electric signal level and applied to a "temperature" responsive meter movement provided with two set point indices, which define low temperature, normal temperature, and high temperature ranges. The meter movement is coupled to low and high index single pole double throw relays which are part of controller circuitry that sequentially defines several circuit paths determined not only by the index relays, but by warm-up controls, normal operation controls and manually operated switches used during both normal and alarm conditions so as to complete various of the circuit paths, and, as a result, control the operation of the equipment in response to temperature conditions.

Accordingly, a primary object of this invention is to provide a pyro-scanning and control system which, in response to normal temperature condition, enables the sequencing of required operational steps of an apparatus.

A further object of this invention is to provide an apparatus controller responsive to abnormally high temperatures to inhibit the cycling of the apparatus into its production cycle and phases.

A further object of this invention is to provide control circuitry responsive to abnormal temperatures, high and low, during the production phase of an apparatus and also responsive to operator attention to the abnormal situation.

Another object of this invention is to provide control circuitry responsive to abnormal low temperature during the production phase of an apparatus to inhibit the production.

Other objects and features of this invention will become apparent from the following figures and detailed description of a preferred embodiment.

BRIEF DESCRIPTION OF THE DRAWINGS

FIG. 1 is a pictorial view of apparatus adapted with the temperature responsive control system of this invention;

FIG. 2 is an electrical schematic of the controller system circuitry of this invention; and FIG. 3 is a modified fragmentary portion of the schematic of FIG. 2.

DESCRIPTION OF A PREFERRED EMBODIMENT

FIG. 1 shows in block-like outline a plastic molding arrangement of equipment including a feed hopper 11 leading into a feeder 13, a mold 15, a heating cylinder 17 interposed between the feeder 13 and the mold 15, motive means 19, and a temperature responsive controller 21. Those skilled in the molding art will readily recognize that these basic components represent both injection as well as extrusion equipment. Lying within the heating cylinder 17 would be the typical plunger, or injection type ram, or extrusion type screw, depending upon the type of molding setup.

The motive means 19 represents the electric motor drive and transmission of an extruder, as well as the motor driven hydraulic system for injection molding. A connection 23 between the motive means 19 and the feeder 13 designates the coupling of motive power to all parts of the molding equipment. Control over the motive means depends upon the condition of the controller 21, which is transmitted over line 25.

The heating cylinder 17 contains a plurality of temperature zones subject to various heating and/or cooling elements, as well-known in the art. A plurality of thermocouples or like devices, not shown, are mounted within the heating cylinder and provides discrete electrical outputs into a cable 27, which is coupled into an input of the controller 21. A second output from the controller is provided by a line 29, which is coupled to the energizing means for the heating and cooling elements, also not shown, in the heating cylinder 17.

For optimizing productivity of equipment, such as that illustrated in FIG. 1, yet maintaining close control over quality and safety, the controller 21 defines a plurality of sequential and alternate circuit paths and corresponding production phases tabulated as follows:

(A) Power off, prior to operation;
(B) Power on, instrument warm-up period;
(C) Commence scanning and enable heating of temperature zones;
(D) Pre-enable motive means if all temperature zones lie within the normal limit after a period of warm-up time;
(E) Inhibit motive means if any zone overheats in phase C, or D, and then revert to phase C, after attainment of normal temperature in all zones;
(F) Operator manual energization of motive means;
(G) Temperature fault during operation of motive means; and
(H) Operator attended alarm condition.

FIG. 2 illustrates schematically the circuitry contents of the controller 21. In the lower left corner are the output lines 25 and 29 to the motive means and the heaters respectively. In the upper right corner is the input cable 27 from the thermocouples in the heating cylinder 17. The cable 27 is received by a scanner 31, which is an array of discrete switches periodically selected, as by a motor 33. Typical of the motor driven scanning switches commercially available is the Alnor NY6DP. Each thermocouple output selected by the scanner 31 is applied to a meter movement 35 calibrated with respect to temperature. Preferably, the meter 35 is of the on-off, two set point indices type which employs electron tube plate current to operate a pair of single pole double throw relays. Within the meter, pairs of feedback coils are independently positioned by each set point index. In this manner, when the scanned temperature is below the low set point, both relays are in a first state. When the temperature is between the set points, i.e., in the normal or acceptable range, the low relay switches to its second state. When the temperature exceeds the high set point, the high relay switches to its second state. Thus, three conditions of temperature elicit three logic conditions from the meter movement 35 and its associated relays. Typical of the illustrated meter is the Alnor N-15 Pyrotroller.

As illustrated, relay portions 39a and 39b comprise the low index relay switches, in which the normally closed switch 37a is the low temperature or first state switch and the normally open portion 37b is the normal temperature or second state switch. Similarly, relay portions 39a and 39b comprise the high index switches, in which switch 39a is normally open and is the first or low state switch and the portion 39b is normally closed and is the excess temperature or second state switch.

Coupled to the two sides of the meter 35 are buses 41 and 43, which themselves originate at a pair of input terminals 45 and 47 connectable to a 115 volt AC source, not shown. The terminal 47 and the line 25 are at a common potential.

The illustrated condition of all of the relay contacts are those in the initial phase A, prior to the application of power via the terminals 45 and 47. Upon the application of power in phase B, three distinctive circuit paths are completed between the buses 41 and 43. The first circuit path includes a coil 49 of a time delay-on-release relay circuit. One end of the coil 49 is connected to the bus 43 and to the terminal 47. The timing of this relay circuit is such that its normally closed switching contacts (hereinafter set forth) are opened upon the application of power to the coil 49, are held open during energization of the coil, and for a predetermined time after deenergization of the coil, and then are transferred back to the closed state. Coupled to the other end of the coil 49 is a single pole double throw switch, having its normally closed contacts 53a directly connected as part of the first circuit path during phase B so that power is fed into the low index closed switch portion 37a, which is connected to the bus 41 to complete the first circuit path back to the terminal 45.

The second circuit path established in phase B is traced from the terminal 47 along the bus 43 to one end of an excess temperature relay coil 55. Inasmuch as phase B arises prior to the enabling of the heaters in the heating cylinder 17, the energization of coil 55 cannot be interpreted as caused by excessive heat. To insure that the heaters do not warm up, the energization of the coil 55 opens a set of contacts 57 which leads to the line 29 into the heaters. The contacts 57 feed into a heater contactor power coil 59, which remains disabled while the contacts 57 remain open in phase B. The other end of the coil 55 is coupled to a normally closed relay switch portion 61a, which leads to the normally closed high index contacts 39b. The latter feeds into yet another single pole double throw switch, via its normally closed contacts 63a, which are connected to the bus 41 to complete the second circuit path.

The energizing of the coil 55 closes another set of its switch contacts 65 which is positioned between the time delay coil 49 and the bus 41 and establishes the third circuit path of phase B.

The energization of the time delay coil 49 opens two sets of normally closed contacts 67 and 69. The contact set 67 has one side connected to the bus 41 and the other side connected to an indicating lamp 71, which in turn is connected to the bus 43. The lamp 71 provides a "system ready" indication during phase D in preparation for the operator attended phase F.

The contacts 69, when closed, form part of a circuit path between the terminal 45 and the line 25 leading to the motive means 19. Manual stop and start switches 72 and 73 of the momentary push-to-operate type are interposed in series between the terminal 45 and the contacts 69. The switch 72 is normally closed and the switch 73 is normally open. A motive means power contactor coil 75 connects the contacts 69 to the line 25. A set of contacts 74, shunting the switch 73, are closed upon energization of the coil 75. As will be discussed subsequently, in the normal operation of phase D the contacts 69 are again closed such that, in phase F, operator closing of the switch 73 couples power to the motive means 19.

Phase C automatically commences a few seconds after the initiation of phase B. During those few seconds, the components within the scanner 31 and the meter movement 35 have warmed up and caused the high index relay to change to its first or low state in which the contacts 39a are closed and the contacts 39b are open. This action open circuits the previously defined second circuit path, through the excess temperature coil 55, and completes a fourth circuit path from the bus 43 through the scanner motor 33, through the contacts 39a and 63a to the bus 41. Accordingly, resulting deenergization of the coil 55 affects its contacts 65 and 57 such that the third circuit path through the contacts 65 is opened and a fifth circuit path from the terminal 45 through the contacts 57 to the line 29 is completed. In this manner, heating power is coupled to the heating cylinder 17.

The time controlled coil 49 remains energized during phase C until one of the scanned thermocouples reports a temperature sufficiently warm enough to transfer the low index relay contacts 37a to open and 37b to close. The opening of the contacts 37a opens the first circuit path through the coil 49. At that time, there commences the time delayed holding of the contacts 67 and 69 in the open state. Assuming that all reporting temperature points achieve the normal range during the time delay period, which may be two complete scanning cycles, then, at the end of this period, the contacts will automatically transfer back to their closed state. This action initiates phase D and completes a sixth circuit path through the ready lamp 71. The path through the manual switch 73 and the contacts 69 remains open, since the manual switch has yet to be closed. The closing of the contacts 37b completes a circuit path, the seventh, through the motor 33, the low or normal side 39a of the high index, and the high or normal side 37b of the low index—a prerequisite to the progression to the production phase F.

If the temperature in any of the heater cylinder zones was below the index setting, the first circuit path through the coil 49 and the contacts 53a and 37a would continue complete and the contacts 67 and 69 would be held open. Thus, the ready lamp 71 could not be illuminated and the motive means 19 could not be energized, even if the start switch 73 were enabled. Accordingly, phase C would be prolonged until all reporting points achieved proper temperature. If phase D was attained and then one of the scanned points produced an under heat condition, there would be a reversion to phase C.

If one of the cylinder heating zones reporting to the devices 31 and 35 were to contain excessive temperature, in either phase C or D, the controller circuitry would advance to phase E in which the high index contacts 39b would close and complete the second circuit path through the excess temperature coil 55. Energization of the coil 55 opens its contacts 57 and cuts off power to the heater line 29 and its contactor coil 59. The contacts 65 of the coil 55 are closed and, as just above described, disable the ready lamp 71 and the contacts 69 by energizing the coil 49 through the third circuit path. Since there is excessive temperature, the low index contacts 39a open and open circuit the first circuit path. Since the high index contacts 39a are now open, the scanner motor 33 is open circuited and stops the scanner 31 on the position of the heater zone thermocouple that is sending the excessive temperature reading. This condition of stalemate continues until the absence of heater power allows the excessively heated cylinder portion to cool down to within the acceptable range. At that time, the control circuits revert to the phase C status and progress from there.

In the event that the overheating again arises in phase C or D, the controller would again revert the phase C after a sufficient cooling period. By this time, possibly sooner, the operator would have noted the absence of the enabling of the ready lamp 71 and would have also noted the disabled position of the scanner 31 which designates the overheated cylinder portion. Accordingly, both under heat and over heat conditions prior to entry into the production phase F prevent entry into that production phase and establishes a stand-by status of phase C for under heat and a closed loop of phases C, D and E for over heat.

Assuming that the system is operating properly through phase D, the ready lamp is illuminated, the heater power is being applied, the contacts 69 are closed, and the scanner motor 33 is running. At this time, the controller 21 is enabled to be advanced to the production phase F by the manual closing of the switch 73, which closes the eighth circuit path lying between the terminal 45 and the motive means input line 25, and thereby turns on the motive means 19 for production of molded plastic or any other end product for which the controller 21 and a suitable array of production equipment have been mated.

The closing of the switch 73 also completes another circuit path, the ninth, which energizes a coil 76 interposed between the contacts 69 and the terminal 47. Energization of the coil 76 transfers the contacts of three previously introduced single pole double throw switches such that the contacts 53b, 61b and 63b are closed and their counterparts 53a, 61a and 63a are opened. The opening of the contacts 63a modifies the scanner motor conduction path, the fourth circuit path, such that the closed index contacts 37b and 39a are essential to the continued scanning of the thermocouples in the heater cylinder 17. The transfer of the contacts 53b and 61b are preparatory for the possibility of the fault indicating phase G.

To this point, the controller and seven of its circuit paths have prevented the operation of the scanned equipment during a warming period, in cases of under heat, and in cases of overheat. In the latter situation, the operator has been advised of the location of the overheat. As soon as an erroneous temperature condition ceases, the controller 21 recycles and attempts to advance toward the production phase, which requires the manual closing of an eighth circuit path. Once in the production phase F, it is not desired to stop the motive means automatically or automatically to remove power from the heaters for reasons earlier noted; accordingly, alternate automatic and manual control paths are provided to sequence the controller 21 in the event of a temperature fault condition, as well as other operational considerations.

During the production phase F, both low and excessive temperature readings through the meter 35 will advance the controller to phase G automatically, such that there is generated an alarm condition and a stoppage of the scanner 31 at the specific fault point position. In the event of an excessive temperature fault, the high index contacts 39b close and the contacts 39a open. With contacts 39a open, the circuit path through the scanner motor 33 is disabled so that the pointer of the scanner 31 indicates the location of the thermocouple transmitting the fault condition. The excessive temperature causes the low index contacts 37b to remain closed. There is thus established a tenth circuit path, which passes from the bus 41 through the contacts 37b, 39b and 61b to a junction point 77.

A manually operable acknowledge switch 79 has one side connected to the junction 77 and its other side connected to an acknowledge lamp 81, which in turn is connected to the bus 43 to define an eleventh circuit path. A relay coil 83 is interposed between the bus 43 and the other side of the acknowledge switch and forms with the acknowledge switch a twelfth circuit path. A single pole double throw switch having contacts 85a and 85b is controlled by the coil 83 and is connected between that coil and the junction 77. An alarm element 87, such as a bell, is connected between the normally closed contacts 85b and the terminal 47 to define a thirteenth circuit path. In the event of an excess temperature fault, the tenth and thirteenth circuit paths are completed via the junction point 77 and the alarm element 87 is energized.

In the event of a low temperature fault, the low temperature index relay changes state to open the contacts 37b and close the contacts 37a to establish a fourteenth circuit path from the bus 41 through the closed contacts 37a and 53b to the junction 77 and thereafter through the alarm element circuit path to energize the alarm element 87. Thus, in the event of a temperature fault in the heating cylinder 17, the scanner motor 33 is disabled at the fault location position, the alarm element 87 is energized, the motive means 19 continues to operate, and the heaters continue to be energized. Under these conditions it is the responsibility of the human operator to attempt to correct the fault condition during the continued operation of the production equipment, so that shut down and related problems are avoided.

If the temperature fault is such that it cannot be corrected without turning off the motive means, the manual switch 72 can be pushed into the open or off state to momentarily deenergize the coil 75, which opens the contacts 74 to hold open the eighth circuit path through the switch 73 and the coil 75 to the motive means 19. This motive means off condition forces a reversion from phase G to phase E or C depending upon the temperature conditions and still does not affect the heating of the cylinder 17. In fact, this use of phase reversion via the switch 72 can be employed at the end of a production run or at such times that the feeder requires brief maintenance or adjustment and there is no reason to turn off all power to the system. In the instances that reversion from phase F is initiated by the operator for other than temperature fault conditions, phase D is attained; therefore, he can subsequently return the controller to phase F by reclosing the switch 73 and thus the contacts 74.

Once in phase D, the temperature conditions automatically regain control and can force the shifting into the under heat phase C or the over heat phase E. Thus, an added safety control has been provided, which prevents a return to the production phase F in the event that a temperature fault acknowledged by the operator has not been corrected, or an as yet undetected temperature fault develops while in the reverted to phase D.

During the correction of a temperature fault it could be distracting if the alarm element, especially an audible element, were to continue in the alarm state. The acknowledge switch 79 and related circuit paths provide a remedy which has an added safety factor and places the controller 21 into phase H. Upon closing of the acknowledge switch, the acknowledge lamp 81 and the coil 83 are energized and the contacts 85b are opened to open circuit the path to the alarm element 87. As long as the fault remains, the lamp 81 indicates not only that there is a fault, but that the operator has acknowledged this fact. For this purpose the switch 79 could be of the type that cannot be manually released.

As part of a fault correction situation it may be advisable to scan all heating zones in conjunction with the repair of the fault indicating zone. A manual bypass switch 89 is employed to connect the scanner motor 33 directly to the bus 41 and bypass all of the temperature responsive circuitry.

Upon correction of the temperature fault, the high and low index relays again attain their phase F status with their contacts 37b and 39a closed to thus open circuit the alarm path and energize the scanner motor.

It will be noted that the contacts 63b are closed only when the motive means is energized. An output line 91 connected to the contacts 63b may be utilized for timelog or other data collection purposes.

In the event of a power failure, or when power is purposely cut off, as at the end of a day, the controller 21 reverts back to phase A.

The foregoing description of the elements and operative coaction of the several defined circuit paths of the controller 21 have carried the controlled equipment through a plurality of sequential and alternate phases for both normal and abnormal temperature conditions, fulfilling the objects of this invention. The fourteen enumerated control circuit paths are subject to categorization into three groups or sub-pluralities of circuit paths. A first of these pluralities consists of the first, second, fourth and seventh paths, which contain at least one of the switching index relay components 37a, 37b, 39a, and 39b, and one of the control relay coils 49 and 55 or the control motor 33. A second plurality of circuit paths, namely the third, fifth, sixth and eighth, contain the switch elements 47, 65, 67 and 69 controlled by the control elements of the first plurality of circuit paths. The first and second pluralities of circuit paths coact to sequence the controlled equipment in phases A through F. A third plurality of control circuit paths consists of the ninth through fourteenth circuit paths coactive in the production and alarm phases F through H.

Although this preferred embodiment has been directed to the plastic molding art, it is equally applicable to the control of other forms of equipment subject to temperature scanning and the semi-automatic control of motive means which drives equipment subject to close temperature control.

Those skilled in the art will also appreciate that the switching components could be replaced by more sophisticated devices. Additional circuit modifications would also be appropriate depending upon input-output requirements without departing from the spirit and scope of this invention. For example, in the above description and circuitry it was assumed that the normal temperature range for all reporting zones was such that a single high-low double index range and meter movement 35 was sufficient. However, if certain temperature zone limits are incompatible with other zone limits, additional meter movements can be appropriately coupled between the scanner 31 and the buses 41 and 43. In like manner, the feeder 13 and mold 15 can be included as scanned points of the equipment.

FIG. 2 further illustrates, in dashed lines, a set of contacts 93 controlled by the excess temperature coil 55 and coupled in series between that coil and the alarm path contacts 85b. In the event that it is desired to activate the alarm element 87 not only during a production phase temperature fault but also during an excess temperature fault in the preproduction phase E, the contacts 93 are to be placed in circuit as shown. In view of this modification, the alarm element 87 also will be briefly energized during phase B; however this should not lead to confusion.

FIG. 3 illustrates a further modification of the controller circuitry which, as modified, will automatically inhibit the motive means 19 in the event of a low temperature fault during production phase G. To accomplish this feature, a conductor 95 is inserted to directly connect the time delay coil 49 to the low index contacts 37a which are closed in a low temperature fault condition. The FIG. 2 connection between the contacts 37a and 53a is removed such that the first circuit path through the coil 49 has been modified to energize that coil during a low temperature fault in phase G and cause its contacts 69 to open and open the eighth circuit path to the motive means 19.

In order not to modify other already described controller operations, a set of normally open contacts 97 are serially connected between the bus 41 and the single pole double throw contacts 53a and 53b by a conductor 99. The contacts 97 are controlled by the coil 49 and in fact pair with the contacts 67 in a single pole double throw manner.

What is sought by U.S. Letters Patent is:

1. A temperature responsive controller system for sequencing the operational phases of production equipment, both during pre-production as well as production phases of the equipment, in response to temperature conditions within the equipment, said controller system comprising:

means for monitoring the equipment temperature conditions and for defining and sensing a plurality of discrete temperature ranges, switching component means directly responsive to said monitoring means and attaining one of a plurality of states corresponding to the sensed temperature range, a first plurality of control circuit paths, each path including in part said switching component means and in part at least one control element, a plurality of switch elements, each respectively responsive to one said control element, a second plurality of control circuit paths each including at least one said switch element, said circuit paths coacting with one another in a first mode when said switching component means attains a normal temperature state, to sequence the equipment through its pre-production operational phases, certain of said circuit paths coacting with one another in a second mode when said switching component means attains a low temperature state, to inhibit the sequencing of the equipment to its production phases, and said circuit paths coacting with one another in a third mode when said switching component means attains a high temperature state to sequence the equipment to a phase other than one of its pre-production or production phases.

2. A controller system as defined in claim 1 in which the control element in a first of said first plurality of circuit paths comprises a time delay element.

3. A controller system as defined in claim 2 in which a second circuit path of said first plurality of circuit paths contains one of said control elements which is energized during said third mode, and a third circuit path of said second plurality of circuit paths contains one of said switch elements which is responsivce to said second circuit path control element to close said switch element and complete a conductive path through said time delay element and shunts said switching component means.

4. A controller system as defined in claim 3 in which said first plurality of circuit paths comprises a fourth and a seventh circuit path both containing a drive means for said monitoring means, said circuit paths coacting with said switching component means in said third mode to inhibit said drive means.

5. A controller system as defined in claim 2 in which said second plurality of circuit paths comprises a sixth and an eighth circuit path each containing one of said switch elements, and both of said contained switch elements are responsive to said time delay element.

6. A controller system as defined in claim 5 in which said sixth circuit path includes a ready lamp which, through said time delay element, is enabled when said circuit paths are coacting in said first mode.

7. A controller system as defined in claim 5 in which said eighth circuit path couples said system to a motive means for the production equipment and further includes a motive means starting switch capable of being activated only by means external said system when said circuit path coacts in said first mode, to thereby sequence the equipment into its production phases.

8. A controller system as defined in claim 1 in which a second circuit path of said first plurality of circuit paths contains one of said control elements which is energized during said third mode.

9. A controller system as defined in claim 8 in which a fifth circuit path of said second plurality of circuit paths couples said system to temperature changing means for the production equipment and said switch element of said fifth circuit path is controlled to open by the control element of said second circuit path during said third mode.

10. A controller system as defined in claim 9 in which a fourth circuit path of said first plurality contains a drive means for said monitoring means which, in said second mode, is operative while said second circuit path control element is in a deenergized condition to close the switch element of said fifth circuit path, said second mode being retained as long as said switching component means is in its low temperature state.

11. A controller system as defined in claim 1 which further comprises:

a third plurality of control circuit paths, a ninth circuit path within said third plurality and partially enabled by one of said switch elements of said second plurality during said first mode, and a starting switch activatable by means external said system for completing the enabling of said ninth path upon the sequencing of the production equipment into its production phases.

12. A controller system as defined in claim 11 in which said ninth circuit path contains a control element which is linked to switch elements in tenth and fourteenth circuit paths of said third plurality, and said two last named paths are coupled to said switching component means.

13. A controller system as defined in claim 12 in which there is a switch element in a fourth circuit path of said first plurality that is controlled by the ninth circuit path control element, and a drive means for said monitoring means is in said fourth circuit path.

14. A control system as defined in claim 13 and further comprising:

an alarm element and a switch element in a thirteenth circuit path of said third plurality, said thirteenth path being serially connected to said tenth and fourteenth circuit paths such that when said switching component means attains a low or a high temperature state said drive means is disabled and said alarm element is energized.

15. A controller system as defined by claim 14 and further comprising:

a manually controlled switch and a lamp enabled thereby, series connected in an eleventh circuit path of said third plurality, and a control element in a twelfth circuit path of said third plurality energized through said manual switch and in turn controlling said switch element in said thirteenth path to disable its alarm element.

16. A temperature responsive controller system for sequencing the operational phases of production equipment, both during pre-production as well as production phases of the equipment, in response to temperature conditions of several points within the equipment, said controller system comprising:

means for monitoring the equipment temperature conditions at said several points and for defining and sensing a plurality of discrete temperature ranges, switching component means directly responsive to said monitoring means and attaining one of a plurality of states corresponding to the sensed temperature range, including low, normal, and high states, scanning means coupled to said monitoring means to enable the discrete selection of each of said several points, one control circuit path linking said system to temperature affecting means for said equipment, another control circuit path linking said system to a motive means enabler for said equipment, a manual switch connected in said another control circuit, a plurality of control elements, a plurality of switching elements operated by said control elements, several other interacting control circuit paths defined by said elements in response to the state of said switching component means, such that closing of said manual switch during said low or high estate cannot complete said another control circuit path and, subsequent to the attainment of said normal state and the closing of said manual switch, said system cannot automatically open said one control circuit path, but does disable said scanning means so as to indicate the equipment point eliciting said switching component means to attain a low or high temperature state.

17. A controller system as defined in claim 16 in which one of said control elements is logically coupled between said switching component means and said another control circuit path to open that path to inhibit said motive means enabler when said switching component means attains said low state.

18. A controller system as defined in claim 16 in which one of said control elements is logically coupled to said another control circuit path to cooperate with said manual switch for completing that circuit path, and said switching component means and certain of said other circuit paths are intercoupled for coacting, when said switching component means is in said low state, to shunt said one control element to maintain said another control circuit path completed and said motive means enabler energized.

19. A controller system as defined in claim 16 in which certain of said other control circuit paths contain first indicator means responsive to said normal state prior to the closing of said manual switch, and second indicator means responsive to said high and low states only subsequent to the closing of said manual switch.

20. A controller system as defined in claim 19 in which an excess temperature control element is in a certain of said other control circuit paths, and one of said switching elements is operated by that control element to enable said second indicator means in the high state condition during the pre-production phases of said equipment.

21. A controller system as defined in claim 19 in which some of said other control circuit paths contain third indicator means and switch means for shunting said second indicator means.

22. A controller system as defined in claim 21 in which each of said control elements is a current reactive element, one of which is a time delay element.

References Cited

UNITED STATES PATENTS

| | | | |
|---|---|---|---|
| 2,518,905 | 8/1950 | Kniveton | 263—3 |
| 2,832,879 | 4/1958 | Van Riper | 219—492 |
| 3,250,124 | 5/1966 | Sylvander | 236—78 X |

WILLIAM E. WAYNER, *Primary Examiner.*

U.S. Cl. X.R.

165—12; 219—492; 236—15; 307—39